No. 740,715. Patented October 6, 1903.

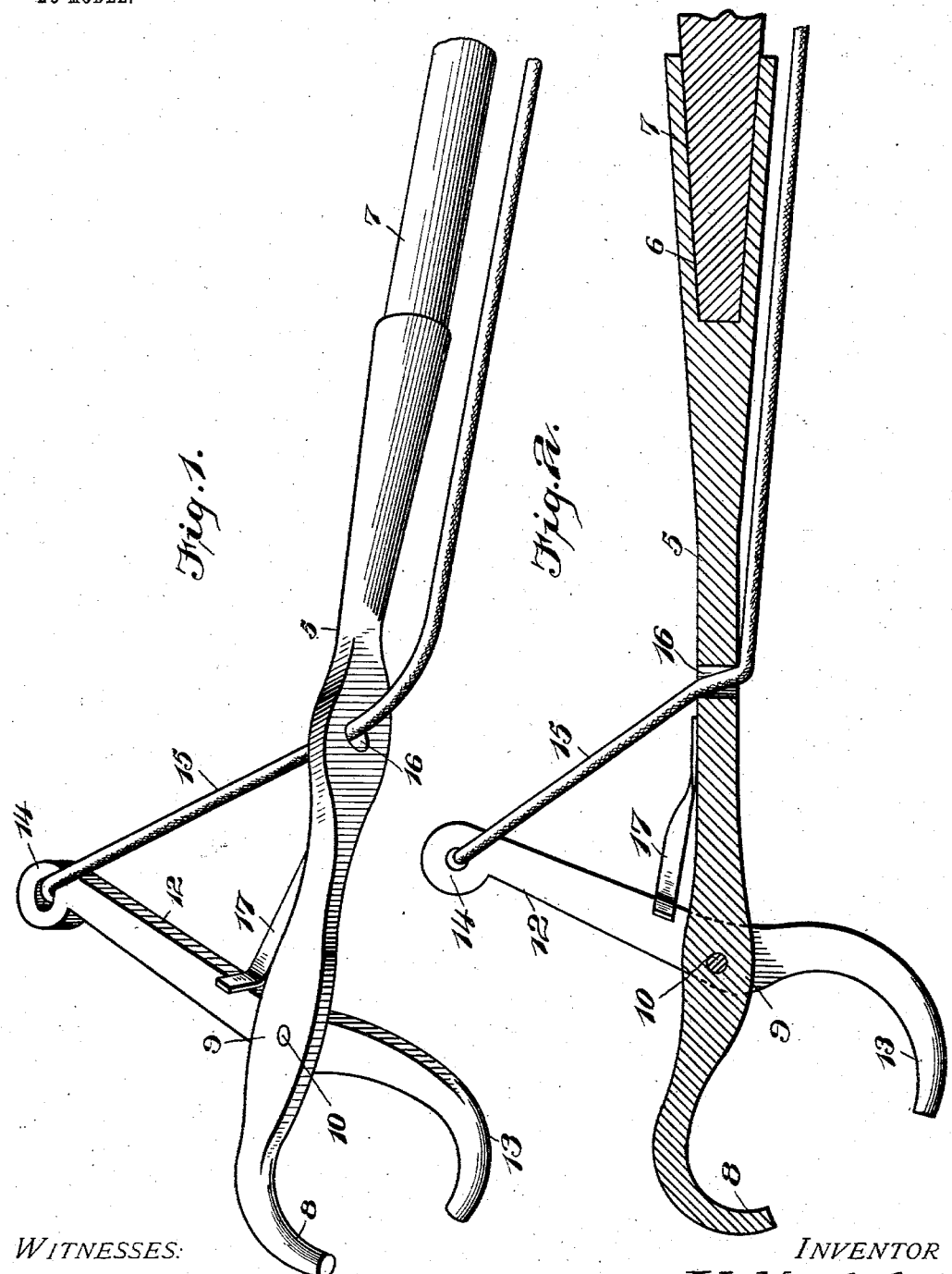

UNITED STATES PATENT OFFICE.

JACOB L. VANDERBURG, OF HOT SPRINGS, ARKANSAS.

HOG-TONGS.

SPECIFICATION forming part of Letters Patent No. 740,715, dated October 6, 1903.

Application filed January 21, 1903. Serial No. 139,925. (No model.)

*To all whom it may concern:*

Be it known that I, JACOB L. VANDERBURG, a citizen of the United States, residing at Hot Springs, in the county of Garland, State of Arkansas, have invented certain new and useful Improvements in Hog-Tongs; and I do hereby declare the following to be a full, clear, and exact description of the invention, such as will enable others skilled in the art to which it appertains to make and use the same.

This invention relates to hog tongs or catchers; and it has for its object to provide a cheap and simple construction which may be easily operated to catch and securely hold the leg of a hog, other objects and advantages of the invention being evident from the following description.

In the drawings forming a portion of this specification, and in which like numerals of reference indicate similar parts in both views, Figure 1 is a perspective view showing the tongs in open position. Fig. 2 is a view showing the main member in section and the supplemental member in elevation.

Referring now to the drawings, the present catcher or tongs consists of a main member, including a central or shank portion 5, having at one end a socket 6, in which is received a handle 7, which may be of any desired length, the opposite end of the shank terminating in a laterally-directed hook 8.

The shank 5 at the base of the hook 8 is broadened laterally, as shown at 9, and is perforated to receive the pivot 10, through the medium of which the minor member or supplemental member is connected to the main member. The supplemental member includes a shank portion 12, through which the pivot-bolt is loosely engaged and at one end of which is the laterally-directed hook 13, which coöperates with the hook of the main member to effect a gripping action when said members are moved upon their pivot. At the opposite end of the shank 12 is a ring 14, through which is engaged a cord 15, which may be drawn upon to swing the supplemental member upon the pivot and move the gripping-jaws toward each other. The shank of the main member is broadened adjacent to the socket 6 at right angles to the direction of broadening of the portion through which the pivot-bolt is engaged, and through this broadened portion is formed a perforation 16, through which the cord is passed and for which it acts as a guide, said cord after being passed through the perforation being taken longitudinally of the handle, so that while one hand of the operator grasps the handle the other hand may draw the cord.

To hold the jaws yieldably in open position, so that they will not move toward each other until the cord is drawn, a spring-plate 17 may be provided and attached to the shank of the main member in position to bear with its end against the supplemental member, this bearing portion of the spring being turned upwardly at an angle, so that when the cord is placed under proper tension the supplemental member will be forced under the plate and in closed position.

What is claimed is—

A hog-catcher comprising a main shank portion having a hook at one end and a socket at the opposite end to receive a handle and having a guide between the hook and socket, a supplemental member pivoted to the first member and having a hook at one end for coöperation with the first-named hook and an eye at its opposite end, a cord engaged in the eye and passed through the guide, and a spring-plate secured to the first member between its socket and its point of pivotal connection with the second member, said spring-plate extending away from the socket from its point of attachment and having its free end portion bent laterally at an obtuse angle and lying in the path of movement of the second member toward the first member, said spring-plate being laterally yieldable with its laterally-turned end portion out of the path of movement of said second member.

In testimony whereof I affix my signature in presence of two witnesses.

JACOB L. VANDERBURG.

Witnesses:
GEO. H. LOWER,
JAS. M. ANDERSON.